INVENTORS
ALFRED CLARK
J.N. FINCH

ATTORNEYS 3,341,620
PROCESS FOR DIMERIZATION OF ETHYLENE OVER NICKEL OXIDE-SILICA-ALUMINA CATALYST
Alfred Clark and Jack N. Finch, Bartlesville, Okla., assignors to Phillips Petroleum Company, a corporation of Delaware
Filed Dec. 7, 1964, Ser. No. 416,214
6 Claims. (Cl. 260—683.15)

ABSTRACT OF THE DISCLOSURE

In dimerizing ethylene in contact with a nickel oxide-silica-alumina catalyst to produce 1-butene and 2-butenes, the yield of 1-butene is increased by pretreating the catalyst with gaseous ammonia at a temperature in the range of 175 to 300° C.

---

This invention relates to an improved process or method for dimerizing ethylene in contact with nickel oxide-silica-alumina catalysts.

The process of dimeriizng ethylene to butenes over a supported nickel oxide catalyst is known. In such a process the 2-butenes are found in the product stream in predominant quantities over the 1-butene. This follows the thermodynamically limited equilibrium distribution of butene isomers which favors the presence of the 2-butenes over a wide range of temperatures.

This invention is concerned with a method by which dimerization of ethylene over nickel oxide-silica-alumina catalysts results in the production of predominant quantities of 1-butene as compared with the 2-butenes.

Accordingly, it is an object of the invention to provide an improved process for dimerizing ethylene in which the yield of 1-butene is greatly enhanced. Another object is to provide a method of dimerizing ethylene in contact with nickel oxide-silica-alumina catalysts which increases the total yield of butenes. Other objects of the invention will become apparent to one skilled in the art upon consideration of the accompanying disclosure.

A broad aspect of the invention comprises dimerizing ethylene to butenes over a nickel oxide-silica-alumina catalyst which has been pretreated with a quantity of ammonia vapor in the range of 0.06 to $0.18 \times 10^{-3}$ mols per gram of catalyst at a treating temperature in the range of 175 to 300° C. The preferred amount of ammonia is in the range of 0.08 to $0.14 \times 10^{-3}$ mols per gram of catalyst and the preferred temperature is in the range of 200–225° C. The contact of the ammonia with the catalyst is effected in the absence of other reactive gases and is preferably carried out in a partial vacuum for a time which may range from a few minutes to several hours. The amount of ammonia that must be pre-adsorbed increases with decreasing treatment temperature. The ammonia may be diluted with an inert gas but it is preferred to exclude other gases from the system during the ammonia treatment.

It has been found that the distribution of the butene isomers predominantly to 1-butene from such a process can be effected by pre-treatment of the catalyst with specific quantities of ammonia. It has further been found that such an ammonia treatment is effective only within a relatively narrow treatment temperature range. Treatment of the catalyst with the prescribed quantity of ammonia either above or below this range results in smaller quantities of 1-butene being produced as well as a decreased yield of all butenes.

The nickel oxide-silica-alumina catalysts applicable to this invention are the catalysts well known in the art. The silica-alumina portion usually consists of from about 75 to about 95 weight percent silica but may be lower or higher than this range. The catalyst contains from about 0.1 to about 10 weight percent nickel (calculated as the metal though present as the oxide). It can be prepared by any conventional means known in the art such as by impregnation, coprecipitation and the like. This catalyst compound is conventionally activated such as by heating in a stream of flowing air at a temperature of 425–620° C. from about 3 to about 20 hours.

The dimerization of ethylene over the above prepared and treated catalyst is carried out at temperatures which range from about −20 to about 325° C. and at pressures which range from atmospheric to about 2000 p.s.i.g. Preferably, temperatures are maintained in the range of about room temperature to about 150° C. and the pressure is generally not more than about 100–300 p.s.i.g. The contact of the ethylene with the catalyst can be carried out with any conventional apparatus such as one using a fixed catalytic bed or a fluidized catalytic bed. The gaseous hourly space velocity of the ethylene is in the range of about 10 to about 3000 v./v./hr.

The theoretical reason for the effectiveness of the invention is not completely understood but it is believed that the ethylene is first polymerized principally to 1-butene. The 1-butene product, however, is immediately isomerized to an equilibrium mixture of normal butenes by the isomerization sites on the catalyst. The catalyst surface possesses a broad distribution of adsorption-site energies and specific catalytic activities, such as isomerization, are associated with relatively narrow ranges of site energies. When these acidic sites are poisoned by ammonia at a relatively high temperature (about 200° C.) only those of relatively high energy are capable of being poisoned whereas the same amount of ammonia contacted at relatively low treating temperatures will randomly poison all sites since then even the low energy sites can be involved. The higher the treatment temperature the higher the site energy must be to be occupied by the ammonia. Isomerization activity appears to be related to sites of intermediate energy, the high energy sites not being involved at all in the reaction with ethylene. Polymerization activity appears to be due principally to the low energy sites. Hence, both the quantity of ammonia used and the treatment temperature are important in selectively poisoning only those sites which will result in maintaining dimerization activity but restricting isomerization activity.

Treating the catalyst with selected amounts of ammonia reduces the formation of polymer heavier than butene as well as improving the 1-butene/2-butene ratio, but over-treating results in a rapid decrease in all catalytic activity. This is likely when the ammonia treatment is carried out at relatively low temperatures. The ethylene feed to the process may be diluted, if desired, by an inert gas such as helium, nitrogen, $CO_2$, normally gaseous paraffins, etc.

The following example illustrates and demonstrates the invention but is not to be construed as unnecessarily limiting the same.

*Example*

A nickel oxide-silica-alumina catalyst was prepared by impregnating a 30–60 mesh silica-alumina base, which contained about 87 weight percent silica (Houdry low density), with nickel nitrate solution containing the appropriate metal content. The catalyst was then thoroughly dried at 110° C. About a 5 gram quantity of catalyst was charged into a fixed bed reactor and activated in situ for each test. Activation was carried out by first heating to 210° C. in a stream of dry air and holding at that temperature for 1 hour to decompose the nitrate. Next the catalyst was slowly heated to 500° C. and held there in a stream of dry air for 4 hours. The catalyst was then cooled and flushed with helium for each test.

The catalyst was pre-treated within the reactor with ammonia under static conditions. The reactor and catalyst were first heated under vacuum to the desired temperature and then a known amount of ammonia was admitted to the closed system. The contact of the ammonia with the catalyst was allowed to continue at that temperature for 1½ hours. The catalyst was then cooled to the reaction temperature for the conversion of ethylene.

Before contacting the catalyst bed within the reactor, the ethylene was diluted with helium such that the ethylene partial pressure was about 33 mm. The reaction temperature was maintained at 25° C. and the reactor effluent was analyzed by vapor phase chromatography. The time of the runs was about 114 minutes.

The table below shows the results of several tests in which ethylene was dimerized over nickel oxide-silica-alumina catalyst which had been treated with varying amounts of ammonia and under varying conditions.

Figure 1:
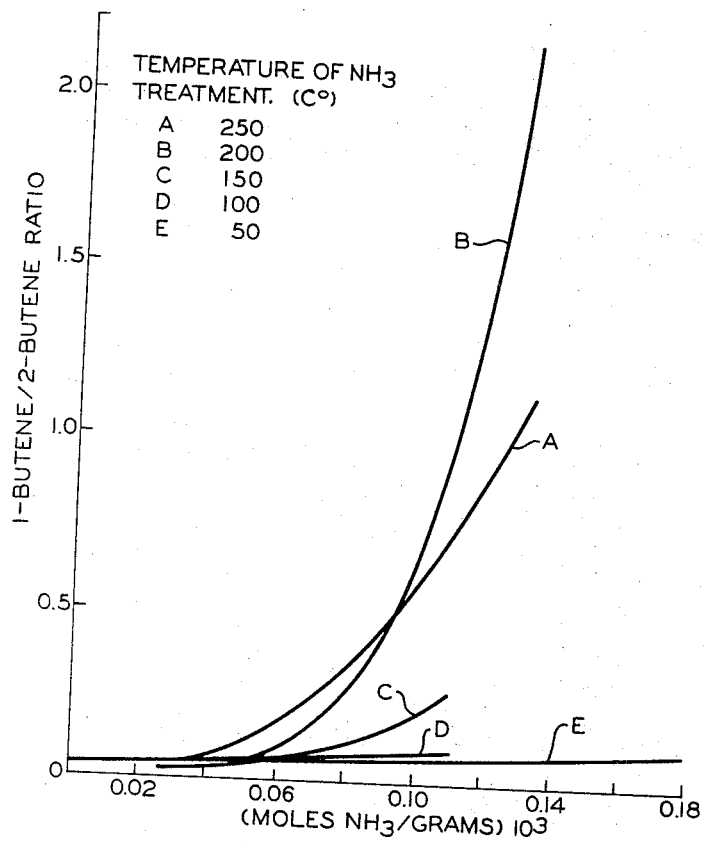
FIGURE 1 shows the beneficial effects of the present invention with regard to the ratio of 1-butene to 2-butene operating at 25° C. with ¼ percent nickel oxide on silica-alumina in dimerizing ethylene.

disclosed are not to be construed as imposing unnecessary limitations on the invention.

We claim:
1. In a process for dimerizing ethylene over a nickel oxide-silica-alumina catalyst to produce 1-butene and 2-butenes, the method of increasing the yield of 1-butene which comprises pretreating said catalyst with gaseous ammonia in an amount in the range of 0.06 to $0.18 \times 10^{-3}$ moles per gram of catalyst at a temperature in the range of 175 to 300° C.

2. The method of claim 1 wherein the pretreating pressure is in the range of 100 to 300 p.s.i.g. and the time ranges from a few minutes to several hours.

3. A process for dimerizing ethylene which comprises the steps of:
   (a) contacting a nickel oxide-silica-alumina catalyst with gaseous ammonia in an amount in the range of 0.06 to $0.18 \times 10^{-3}$ moles per gram of catalyst at a temperature in the range of 175 to 300° C.;
   (b) contacting ethylene with the catalyst resulting from step (a) at a temperature in the range of about from $-20$ to 325° C., a pressure in the range of 100 to 300 p.s.i.g., and an ethylene gaseous hourly space velocity in the range of about 10 to 3000 v./v./hr.; and
   (c) recovering 1-butene and 2-butenes from the reaction effluent.

4. The process of claim 3 wherein the temperature in step (a) is in the range of about 200 to 225° C.

5. The process of claim 3 wherein the ethylene in step (b) is diluted with an inert gas.

6. The process of claim 3 wherein the range of ammonia is 0.08 to $0.14 \times 10^{-3}$ and the temperature range is 200 to 225° C. in step (a).

TABLE.—CONVERSION OF ETHYLENE OVER NICKEL OXIDE-SILICA-ALUMINA

| Run No. | NH$_3$ Treatment, Temp., ° C. | Moles NH$_3$/g.×10$^3$ | Ethylene Consumed, Moles/g.×10$^4$ | Ethylene Conversion, Percent | Yield Butenes, Percent | Butene Isomer Distribution ||| 
|---|---|---|---|---|---|---|---|---|
| | | | | | | 1-Butene | Trans-2-Butene | Cis-2-Butene |
| Section A—0.25 wt. percent nickel in catalyst ||||||||| 
| 1 | | None | 3.68 | 8.9 | 43 | 4.8 | 71.3 | 23.9 |
| 2 | 50 | 0.052 | 2.69 | 7.6 | 50 | 6.2 | 68.7 | 25.0 |
| 3 | 50 | 0.12 | 1.73 | 3.7 | 58 | 6.5 | 66.6 | 26.9 |
| 4 | 50 | 0.16 | 0.78 | 1 | 75 | 9 | 65 | 26 |
| 5 | 50 | 0.18 | Inactive | | | | | |
| 6 | 100 | 0.050 | 2.59 | 6.7 | 51 | 6.5 | 69.0 | 24.4 |
| 7 | 100 | 0.11 | 1.24 | 3.3 | 46 | 7.6 | 69.4 | 23.0 |
| 8 | 100 | 0.17 | Inactive | | | | | |
| 9 | 150 | 0.025 | 3.09 | 8.8 | 51 | 4.2 | 70.6 | 25.2 |
| 10 | 150 | 0.048 | 2.08 | 6.0 | 50 | 4.9 | 69.4 | 25.4 |
| 11 | 150 | 0.11 | 0.60 | 2.9 | 73 | 21.4 | 42.8 | 35.7 |
| 12 | 150 | 0.16 | Inactive | | | | | |
| 13 | 200 | 0.046 | 3.39 | 14.9 | 48 | 4.7 | 70.5 | 24.8 |
| 14 | 200 | 0.089 | 2.10 | 10.5 | 78 | 28.5 | 35.7 | 35.7 |
| 15 | 200 | 0.11 | 1.62 | 7.8 | 100 | 51.2 | 26.6 | 22.1 |
| 16 | 200 | 0.13 | 1.27 | 4.9 | 78 | 67.6 | 18.8 | 13.5 |
| 17 | 250 | 0.026 | 2.18 | 10 | 49 | 3.7 | 71.5 | 24.6 |
| 18 | 250 | 0.051 | 2.50 | 12 | 55 | 9.9 | 60.0 | 30.2 |
| 19 | 250 | 0.10 | 2.38 | 4 | 80 | 38.0 | 33.3 | 28.6 |
| 20 | 250 | 0.13 | 2.53 | 9 | 76 | 52.4 | 26.2 | 21.4 |
| Section B—2.5 wt. percent nickel in catalyst ||||||||| 
| 21 | | None | 9.44 | 23.3 | 54 | 11 | 56 | 33 |
| 22 | 200 | 0.13 | 5.10 | 10.4 | 66 | 53.6 | 28 | 18.5 |
| 23 | 200 | 0.16 | 4.45 | 8.2 | 65 | 56.1 | 26.9 | 16.9 |

Figure 2:
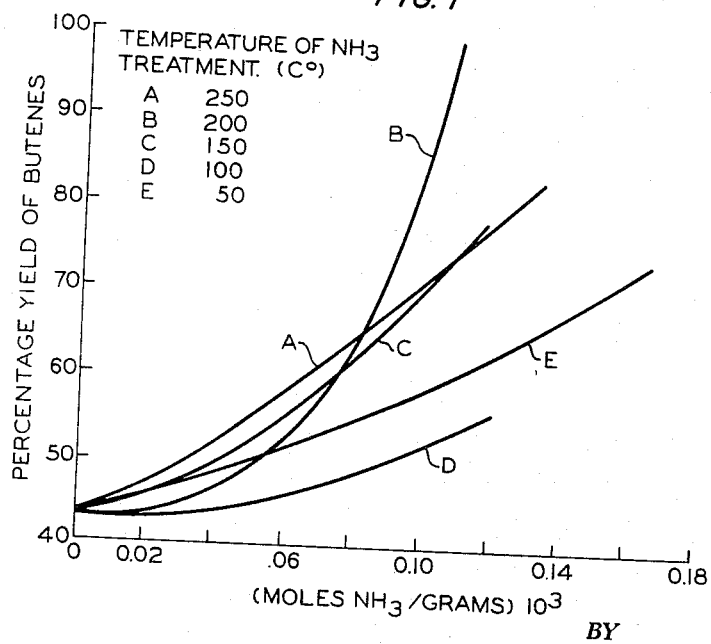
FIGURE 2 shows the beneficial effect in regard to the total yield of butenes under the conditions of FIGURE 1.

The data in the table show that the treatment of the catalyst with specific quantities of ammonia at elevated temperatures results in greatly increasing the quantity of 1-butene isomer in the stream of butene products. The total yield of butenes is also increased. These effects are at a maximum when the ammonia treatment temperature is about 200° C. and the quantity of ammonia used is $0.13 \times 10^{-3}$ moles ammonia/g. catalyst. Quantities of ammonia substantially greater or lesser than this at treatment temperatures substantially higher or lower than 200° C. produce correspondingly less advantageous results. These same effects are also graphically presented in FIGURES 1 and 2.

Certain modifications of the invention will become apparent to those skilled in the art and the illustrative details

References Cited

UNITED STATES PATENTS

| | | | |
|---|---|---|---|
| 2,881,233 | 4/1959 | Clark | 260—683.15 |
| 2,904,608 | 9/1959 | Holm et al. | 260—683.15 |
| 2,921,971 | 1/1960 | Holm et al. | 260—683.15 |
| 3,005,033 | 10/1961 | Engelbrecht et al. | 260—683.15 |

PAUL M. COUGHLAN, Jr., *Primary Examiner.*